United States Patent [19]

Chiba et al.

[11] Patent Number: 4,542,907
[45] Date of Patent: Sep. 24, 1985

[54] CORRUGATED EXPANDER FOR PISTON RING ASSEMBLY

[75] Inventors: Ko Chiba, Tokorozawa; Yoshiaki Wada, Niigata; Hiroshi Miida; Sumio Ono, both of Kashiwazaki, all of Japan

[73] Assignee: Kabushiki Kaisha Riken, Tokyo, Japan

[21] Appl. No.: 623,212

[22] Filed: Jun. 21, 1984

[30] Foreign Application Priority Data

Nov. 24, 1983 [JP] Japan .......................... 58-180143[U]

[51] Int. Cl.$^4$ ............................................. F16J 9/06
[52] U.S. Cl. .................................... 277/140; 277/141; 267/1.5
[58] Field of Search ............................... 277/139–141, 277/146, 149, 157, 163; 267/1.5

[56] References Cited

U.S. PATENT DOCUMENTS

| | | | |
|---|---|---|---|
| 2,789,872 | 4/1957 | Olson | 277/139 |
| 2,831,738 | 4/1958 | Marien et al. | 277/140 X |
| 2,877,072 | 3/1959 | Pien | 267/1.5 X |
| 2,917,353 | 12/1959 | Baumler et al. | 267/1.5 |
| 3,004,811 | 10/1961 | Mayfield | 267/1.5 X |
| 3,580,589 | 5/1971 | Prasse et al. | 267/1.5 X |

Primary Examiner—Robert S. Ward
Attorney, Agent, or Firm—Finnegan, Henderson, Farabow, Garrett & Dunner

[57] ABSTRACT

The annular expander of a piston ring assembly with vertically extending notches each of which is formed on either side of a plurality of circumferentially spaced upstanding tabs projecting from the top and bottom edges of the expander. The tabs, which form the abutments for the inner peripheral edges of upper and lower annular side rails, the outer peripheral edges of which are in sliding contact with a cylinder wall, undergo elastic deformation made possible by the notches when the corresponding side rails are subjected to a strong force received from the cylinder wall owing to piston wobble during reciprocation. The elastic deformation of the tabs assures that the side rails will remain in contact with the cylinder wall at all times during the reciprocation of the piston.

3 Claims, 6 Drawing Figures

CORRUGATED EXPANDER FOR PISTON RING ASSEMBLY

BACKGROUND OF THE INVENTION

This invention relates to an improvement in an oil control piston ring assembly of the type having an expander and side rails.

An oil control piston ring assembly, which is used in combination with a pressure ring, is fitted into the groove of a piston employed primarily in internal combustion engines. The piston ring assembly includes a pair of annular side rails the outer peripheral edges of which contact the inner wall of the cylinder in which the piston reciprocates. The side rails thus serve to prevent leakage of oil and, hence, contribute to a reduction in oil consumption.

A problem encountered in reciprocating pistons is that the piston is prone to reciprocate within the cylinder while wobbling from side to side, rather than traveling along a fixed axis at all times. Such wobbling motion causes a variation in the contacting pressure between the cylinder wall and the side rails, one of which is located above the other, and can even cause a gap to form between the cylinder wall and the side rails. Though the reasons for such phenomena will be set forth later in a more detailed description of the prior art, it is obvious that the result will be severe leakage of oil from between the side rails and cylinder wall.

SUMMARY OF THE INVENTION

Accordingly, an object of the present invention is to provide a piston ring assembly devoid of the aforementioned shortcomings encountered in the prior art.

Another object of the present invention is to provide a piston ring assembly in which the side rails remain in stable contact with the cylinder wall regardless of wobbling reciprocation of the piston, thereby preventing the formation of a gap between the cylinder wall and the side rails.

According to the present invention, the foregoing objects are attained by providing a piston ring assembly comprising an expander which includes a generally circular corrugated or convoluted strip having radial corrugations and circumferentially spaced upper and lower tabs projecting substantially vertically from top and bottom edges, respectively, of the corrugated strip, and upper and lower side rails having their inner peripheral edges in abutting contact with the upper and lower tabs, respectively. The corrugated strip of the expander is provided with vertically extending notches each of which is formed on either side of the tabs, which form the abutments for the inner peripheral edges of the side rails, the outer peripheral edges of which are in sliding contact with a cylinder wall. The notches endow the tabs with radially directed resilience, so that the side rails are received resiliently not only by the expander proper, but also by the tabs which flex when the corresponding side rails are subjected to a strong force received from the cylinder wall owing to piston wobble during reciprocation.

BRIEF DESCRIPTION OF THE DRAWINGS

The drawbacks of the prior-art piston ring assembly mentioned briefly hereinabove and the features and advantages of a piston ring assembly according to the present invention will be more clearly understood from the following description taken in conjunction with the accompanying drawings in which.

FURTHER DESCRIPTION OF THE PRIOR ART

Figure 1:
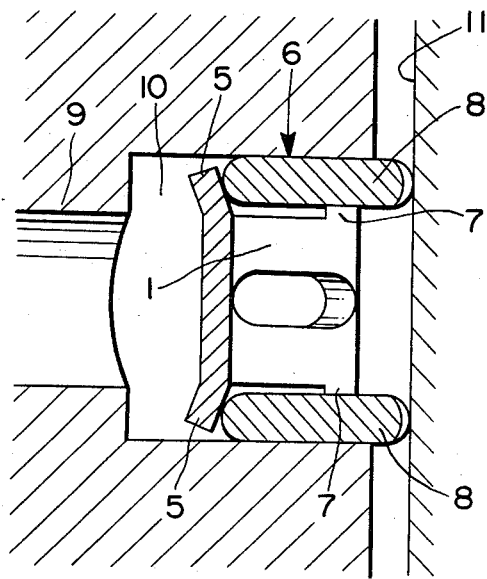
FIG. 1 is an enlarged fragmentary vertical cross-sectional view of an oil control piston ring assembly according to the prior art.
Figure 2:
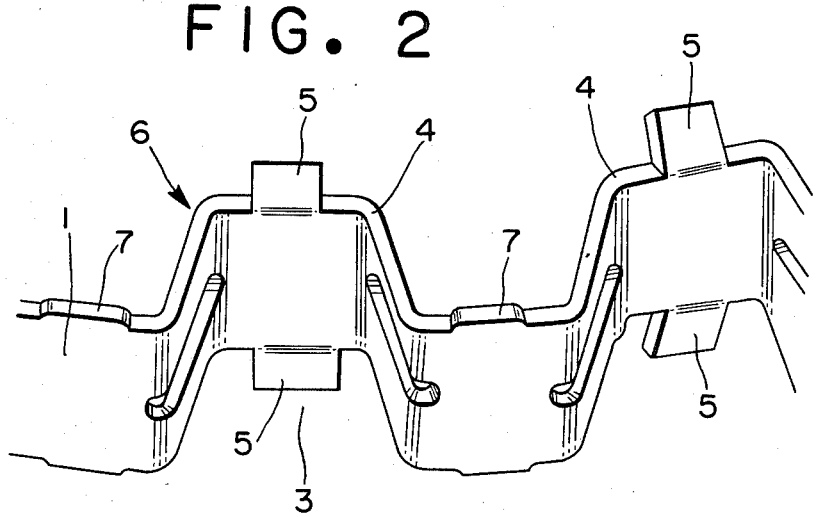
FIG. 2 is an enlarged partial perspective view of an expander included in the piston ring assembly of FIG. 1.

Referring to FIGS. 1 and 2 of the drawings, a prior-art piston ring assembly includes an expander 6 comprising a generally circular corrugated strip 1 having a plurality of convolutions or corrugations 3 extending in a radial plane for providing the strip 1 with a radially directed resilient, spring-like property. The corrugations 3 directed radially inwardly of the strip 1 are provided with upstanding tabs 5 extending substantially vertically from the top and bottom edges of the strip. Thus the corrugated strip 1 includes a plurality of these upper and lower tabs 5 spaced apart circumferentially on what will be the inner circumferential surface of the strip 1 when the strip is fitted into the annular groove 10 of a piston 9, as shown in FIG. 1. The corrugated strip 1 is also formed to include seating pieces 7 extending vertically from the top and bottom edges of the strip 1 at the corrugations directed radially outwardly of the strip. The piston ring also includes a pair of annular side rails 8 which are seated on the expander 6 from the top and bottom sides thereof by having their inner circumferential edges brought into abutting contact with the corresponding tabs 5 while their flat, horizontal inner side surfaces are placed on the corresponding seating pieces 7.

The oil ring assembly comprising the expander 6 and side rails 8 is mounted in the annular groove 10 of the piston 9 so that the outer peripheral edges of the side rails contact the inner wall 11 of the cylinder in which the piston 9 reciprocates. As the piston 9 reciprocates, the side rails 8 travel with the piston while their outer peripheral edges contact the cylinder wall 11, thereby minimizing leakage of oil.

Figure 3:
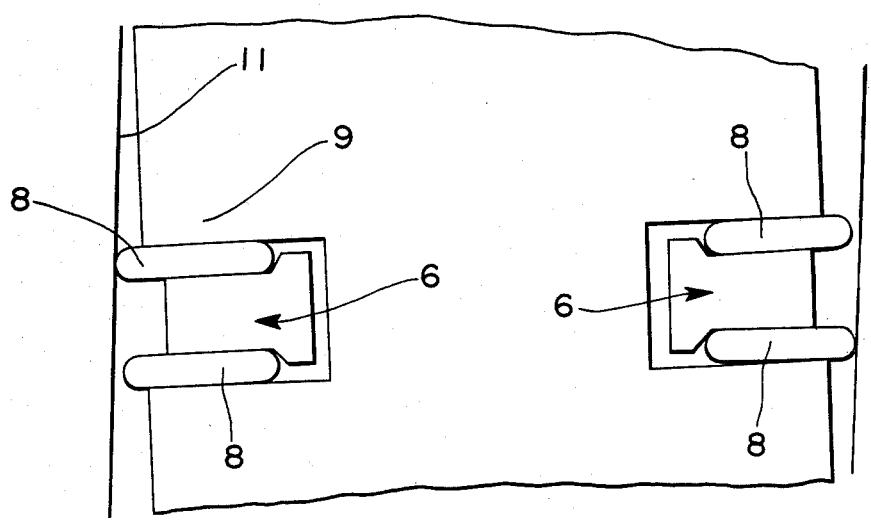
FIG. 3 is a simplified vertical cross-sectional view of the prior-art piston ring assembly and is useful in describing the relationship between the piston ring assembly and the inner wall of a cylinder.

In actual practice, the piston does not always reciprocate within the cylinder along a fixed axis but tends to deviate or wobble from side to side. The result of such piston wobbling, which is depicted in FIG. 3, is a variation in the pressure of contact between the upper and lower side rails 8 and the cylinder wall 11. In cases where piston wobbling is particularly severe, the side rails 8 may actual part from the cylinder wall 11, allowing a large quantity of oil to leak from the gap thus formed.

The variation in contact pressure between the side rails and cylinder wall and, in extreme cases, the formation of the gap between these elements, is believed attributable to the fact that the expander 6 does not exhibit a sufficient spring-like property, especially resilience and torsional characteristics, needed to keep the upper and lower side rails 8 in constant contact with the cylinder wall 11 independently of piston motion when wobbling occurs.

The present invention contemplates an improved piston ring assembly capable of solving the foregoing problem.

DESCRIPTION OF THE PREFERRED EMBODIMENTS

Figure 4:
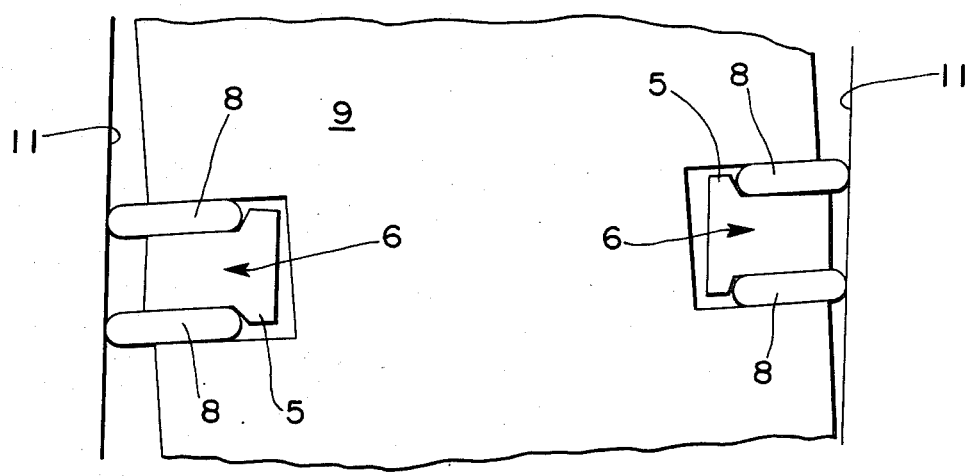
FIG. 4 is a simplified vertical cross-sectional view of an oil control piston ring assembly according to the present invention and is useful in describing the relationship between the piston ring assembly and the inner wall of a cylinder.
Figure 5:
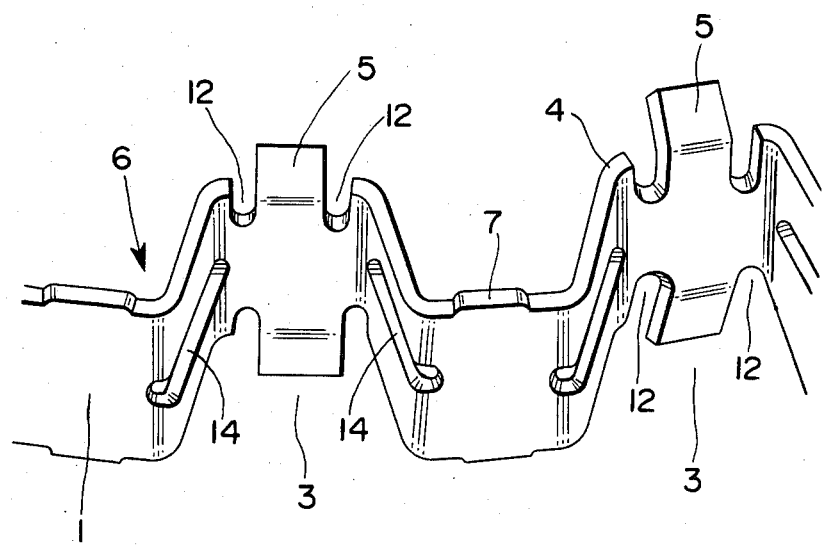
FIG. 5 is an enlarged partial perspective view showing an expander of a first embodiment of a piston ring assembly according to the present invention.
Figure 6:
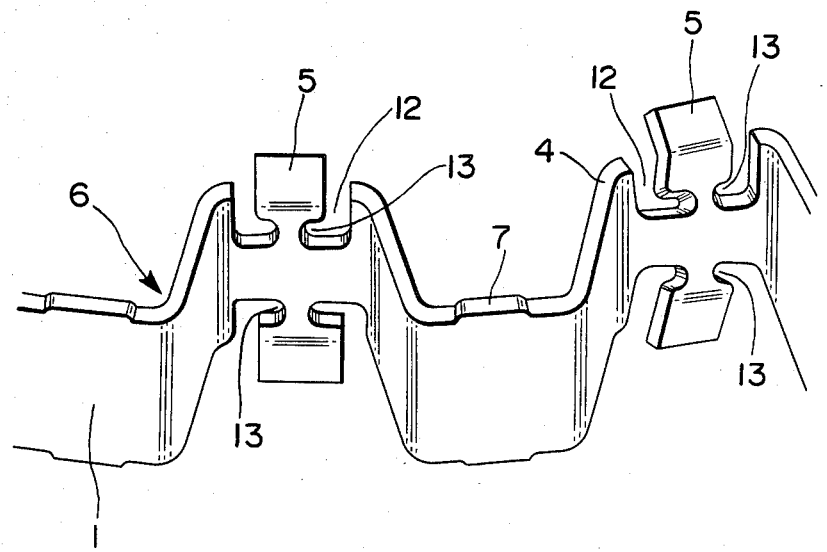
FIG. 6 is an enlarged partial perspective view showing an expander of a second embodiment of a piston ring assembly according to the present invention.

Reference will now be had to FIGS. 4 through 6 to describe a piston ring assembly according to the present invention.

FIG. 4 is a view showing the relationship between the piston ring assembly and the inner wall of a cylinder and is useful in describing the principle of the present invention. When the piston 9 wobbles while reciprocating within the cylinder, one of the side rails 8 is subjected to a strong force received from the cylinder wall 11. If solely the tabs 5 contacting this side rail 8 can be made to undergo radially inwardly directed elastic deformation, then the relationship between the expander 6 proper and the cylinder wall 11 will remain unchanged. As a result, there will be no change in the position of the other side rail 8 relative to the cylinder wall 11, so that both side rails will remain in contact with the cylinder wall 11 at all times while traveling up and down along the wall.

FIG. 5 shows the construction of an expander for achieving the foregoing effects according to a first embodiment of the present invention.

The corrugated strip 1 constituting the expander 6 is provided with notches 12. As shown, the notches 12 are formed in the top and bottom edges of the strip 1, one on each side of the tabs 5, and extend in the vertical direction. The tabs 5 extend substantially vertically from the top and bottom edges of the strip 1 on the inwardly projecting corrugtions 3 thereof and receive the inner peripheral edges of the side rails 8 thereagainst. In a preferred arrangement, each notch 12 has a circumferential width of from 0.2 to 2.0 mm, and a vertical length of from 0.1 to 1.0 mm. The notches 12 provide the tabs 5 with radially directed resilience, allowing the tabs to flex radially when the corresponding side rails, which abut against the tabs 5, are subjected to a strong force received from the cylinder wall when the piston reciprocates in a wobbling manner.

A second embodiment of the present invention is illustrated in FIG. 6. Here the notches 12 on either side of each tab 5 have an extension 13 directed circumferentially inward from the lower end thereof toward the root of the tab 5 to partially undercut the tab and, hence, narrow the root thereof. This provides the tabs 5 with an even greater degree of resilience so that the tabs will undergo elastic deformation more easily when the side rails 8 press against them due to the strong force developed between the side rails and cylinder wall when the piston wobbles during reciprocation.

In the embodiment of FIG. 5, the corrugated strip 1 of the expander 6 is provided with elongate openings 14 extending between the inwardly and outwardly projecting corrugations. The expander 6 in the embodiment of FIG. 6 is devoid of these openings. Whether or not the openings are provided is merely a matter of design.

Since the tabs 5 of the expander 6 can be provided with the necessary resilience merely by forming the notches 12 on either side thereof, the expander can be manufactured by ordinary pressing work without requiring any major modification in the manufacturing process. Furthermore, since the elastic deformation of the tabs 5 assures that the expander proper will not sustain an excessive load when the piston wobbles during reciprocation, the resilience of the expander will remain constant.

As many apparently widely different embodiments of the present invention can be made without departing from the spirit and scope thereof, it is to be understood that the invention is not limited to the specific embodiments thereof except as defined in the appended claims.

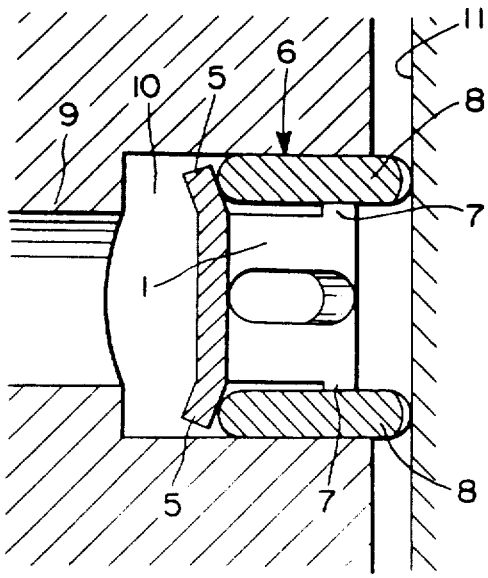

What we claim is:

1. In a piston ring assembly including an expander which comprises a circumferentially extending corrugated strip having a plurality of corrugations extending in a radial plane, a plurality of circumferentially spaced upper and lower tabs projecting substantially vertically from the top and bottom edges of the inner periphery of the corrugated strip and inclined radially inwardly, seating pieces extending vertically from the top and bottom edges of the outer periphery of the strip, and upper and lower side rails having their inner peripheral edges in abutting contact with said upper and lower edges, respectively, and their inner side surfaces resting on the seating pieces to provide a small clearance between the inner side surfaces of the side rails and the remaining portions of the edges of the strip, the improvement wherein the corrugated strip is provided with a vertically extending notch in the top and bottom edges thereof on either side of each tab.

2. The improvement according to claim 1, wherein said notch has a circumferential width of 0.2 to 2.0 mm and a vertical length of 0.1 to 1.0 mm.

3. The improvement according to claim 1, wherein the notch on either side of each tab has an extension directed circumferentially inward from the lower end thereof to partially undercut the tab.

* * * * *

UNITED STATES PATENT AND TRADEMARK OFFICE
CERTIFICATE OF CORRECTION

PATENT NO. : 4,542,907
DATED : September 24, 1985
INVENTOR(S) : Ko Chiba, et al

It is certified that error appears in the above-identified patent and that said Letters Patent is hereby corrected as shown below:

The title page should be deleted to appear as per attached title page.

Signed and Sealed this

Eleventh Day of March 1986

[SEAL]

Attest:

DONALD J. QUIGG

Attesting Officer

Commissioner of Patents and Trademarks

United States Patent [19]

Chiba et al.

[11] Patent Number: 4,542,907
[45] Date of Patent: Sep. 24, 1985

[54] CORRUGATED EXPANDER FOR PISTON RING ASSEMBLY

[75] Inventors: Ko Chiba, Tokorozawa; Yoshiaki Wada, Niigata; Hiroshi Miida; Sumio Ono, both of Kashiwazaki, all of Japan

[73] Assignee: Kabushiki Kaisha Riken, Tokyo, Japan

[21] Appl. No.: 623,212

[22] Filed: Jun. 21, 1984

[30] Foreign Application Priority Data

Nov. 24, 1983 [JP] Japan ............... 58-180143[U]

[51] Int. Cl.$^4$ .................................... F16J 9/06
[52] U.S. Cl. ..................... 277/140; 277/141; 267/1.5
[58] Field of Search ............. 277/139–141, 277/146, 149, 157, 163; 267/1.5

[56] References Cited

U.S. PATENT DOCUMENTS

| | | | |
|---|---|---|---|
| 2,789,872 | 4/1957 | Olson | 277/139 |
| 2,831,738 | 4/1958 | Marien et al. | 277/140 X |
| 2,877,072 | 3/1959 | Pien | 267/1.5 X |
| 2,917,353 | 12/1959 | Baumler et al. | 267/1.5 |
| 3,004,811 | 10/1961 | Mayfield | 267/1.5 X |
| 3,580,589 | 5/1971 | Prasse et al. | 267/1.5 X |

Primary Examiner—Robert S. Ward
Attorney, Agent, or Firm—Finnegan, Henderson, Farabow, Garrett & Dunner

[57] ABSTRACT

The annular expander of a piston ring assembly with vertically extending notches each of which is formed on either side of a plurality of circumferentially spaced upstanding tabs projecting from the top and bottom edges of the expander. The tabs, which form the abutments for the inner peripheral edges of upper and lower annular side rails, the outer peripheral edges of which are in sliding contact with a cylinder wall, undergo elastic deformation made possible by the notches when the corresponding side rails are subjected to a strong force received from the cylinder wall owing to piston wobble during reciprocation. The elastic deformation of the tabs assures that the side rails will remain in contact with the cylinder wall at all times during the reciprocation of the piston.

3 Claims, 6 Drawing Figures